(12) United States Patent
Ma et al.

(10) Patent No.: US 6,788,316 B1
(45) Date of Patent: Sep. 7, 2004

(54) METHOD OF DESIGNATING MULTIPLE HYPERTEXT LINKS TO BE SEQUENTIALLY VIEWED

(75) Inventors: William Hsioh-Lien Ma, Fishkill, NY (US); Wayne Michael Delia, Poughkeepsie, NY (US); William A. Ma, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 09/664,912

(22) Filed: Sep. 18, 2000

(51) Int. Cl.⁷ ................................................. G06F 3/00
(52) U.S. Cl. ..................... 345/760; 345/739; 345/825; 345/829
(58) Field of Search ................................ 345/742, 825, 345/739, 737, 738, 818, 819, 820, 829, 760

(56) References Cited

U.S. PATENT DOCUMENTS

| | | | |
|---|---|---|---|
| 5,446,891 A | 8/1995 | Kaplan et al. | |
| 5,760,771 A | 6/1998 | Blonder et al. | |
| 5,784,564 A | 7/1998 | Camaisa et al. | |
| 5,826,267 A | 10/1998 | McMillan | |
| 5,854,630 A | 12/1998 | Nielsen | |
| 5,918,239 A | * 6/1999 | Allen et al. | 715/526 |
| 5,956,709 A | 9/1999 | Xue | |
| 6,009,429 A | 12/1999 | Greer et al. | |
| 6,195,679 B1 | * 2/2001 | Bauersfeld et al. | 709/203 |
| 6,334,145 B1 | * 12/2001 | Adams et al. | 709/217 |
| 6,408,316 B1 | * 6/2002 | Himmel et al. | 715/501.1 |
| 6,476,827 B1 | * 11/2002 | Porter | 345/738 |
| 6,483,525 B1 | * 11/2002 | Tange | 345/765 |
| 6,507,867 B1 | 1/2003 | Holland et al. | |
| 6,515,681 B1 | * 2/2003 | Knight | 345/751 |
| 6,567,103 B1 | * 5/2003 | Chaudhry | 345/738 |

\* cited by examiner

*Primary Examiner*—Raymond J. Bayerl
*Assistant Examiner*—Shawn Becker
(74) *Attorney, Agent, or Firm*—Todd M. C. Li

(57) ABSTRACT

A method and computer program product is described for displaying files associated with multiple hypertext links selected from a Web page. A user selects a set of links from a Web page that contains multiple links, and the linked files are displayed in a preferred sequence without having to repeatedly return to the original Web page. In addition, files associated with these links can be downloaded while the first links are being displayed and viewed by the user. Thus, both the usability and the performance in Web browsing is improved.

5 Claims, 2 Drawing Sheets

METHOD OF DESIGNATING MULTIPLE HYPERTEXT LINKS TO BE SEQUENTIALLY VIEWED

FIELD OF THE INVENTION

The present invention relates generally to the viewing of Web pages on the Internet from a Web browser. This invention provides a method for preselecting a list of hypertext links and then displaying the Web pages without requiring further intervention by a user.

BACKGROUND OF THE INVENTION

The Internet refers to the network of computers that arose out of the network created by the Advanced Research Projects Agency (ARPA) using the Transmission Control Protocol/Internet Protocol (TCP/IP) as the method for providing communication between the computers on the network. Other networks are in common use. For example, networks known as Intranets, in which the access is limited to users within an organization, also commonly use TCP/IP. A popular method of accessing information across a network such as the Internet is a hypertext-based information system known as the World Wide Web (Web). Hypertext is a means of connecting a variety of discrete information content sources or blocks (referred to in the art as "nodes"), and providing links from one information node to one or more other nodes. A node could comprise a block of text, images, audio, or other types of information. For example, a hypertext document located on a server computer may provide links to documents located within the same document, or within another document on the same server, or to a document located on another server. The location of the information node is usually provided by a Uniform Resource Locator (URL) which provides an address as well as information about the type of data.

Typically, a user will access data on the Web by viewing hypertext files, known as Web sites, and viewing those Web sites with client software known as a Web browser. Commonly, Web sites are written in a programming language, such as Hypertext Markup Language (HTML). A hypertext file that is loaded and displayed by a browser is often referred to as a Web page. A Web page often contains many hypertext links to other files (Web pages, multimedia files, etc.) which may be located on the same computer system, or on any other computer connected on the Internet. Many Web browsers may have their functionality extended by small programs call plug-ins. For example, if the link URL points to a video file, a plug-in may be added to the Web browser to allow a user to view the video without having to install the entire software application that was originally used to create the video file, saving computer resources and providing portability and interoperability. Many other functionality may be added to a browser using techniques known to those skilled in the art.

When a user clicks a hypertext link, typically using an input device known as a pointer, the browser uses the address provided in the URL to load and display the referenced file on the client computer system. If the file is another Web page, the user may choose to follow the links provided on that Web page, and continue on in a similar fashion. Often, though, a user will want to explore a number of the links provided on a given Web page before moving on to another site.

Many Web browsers generally maintain a list of links previously visited. Upon completion of viewing a selected hypertext link, activating the "Back" button returns the user to the previous page featuring the original list of hypertext links. However, this method requires a user to click the "Back" button and reload the original Web page each time before selecting another link. This can be time consuming as well as tedious for a user.

SUMMARY OF THE INVENTION

It is an object of the present invention to provide a user with the ability to preselect a group of hypertext links from a list of links provided on a given Web page and then view these pages in sequence without having to reload the Web page that contained the original list of links.

It is another object of the present invention to provide improved response when viewing a sequence of selected hypertext links.

According to a preferred embodiment of the present invention, a method and utility is provided to extend the function of a Web browser to allow a user to select a list of hypertext links to view in a preferred sequence. According to the present invention, when the user clicks on a hypertext link, the URL is copied to a list rather than causing the page, or more generally, the node, to be loaded. When the user has finished selecting list of links to view, the utility will then display the first selected node, and load the other selected nodes (or pages) while the user is viewing the first node. When the user has completed viewing the first node, the next node may be displayed with improved performance because the downloading has already started or has been completed.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

DESCRIPTION OF THE PREFERRED EMBODIMENTS

Figure 1:
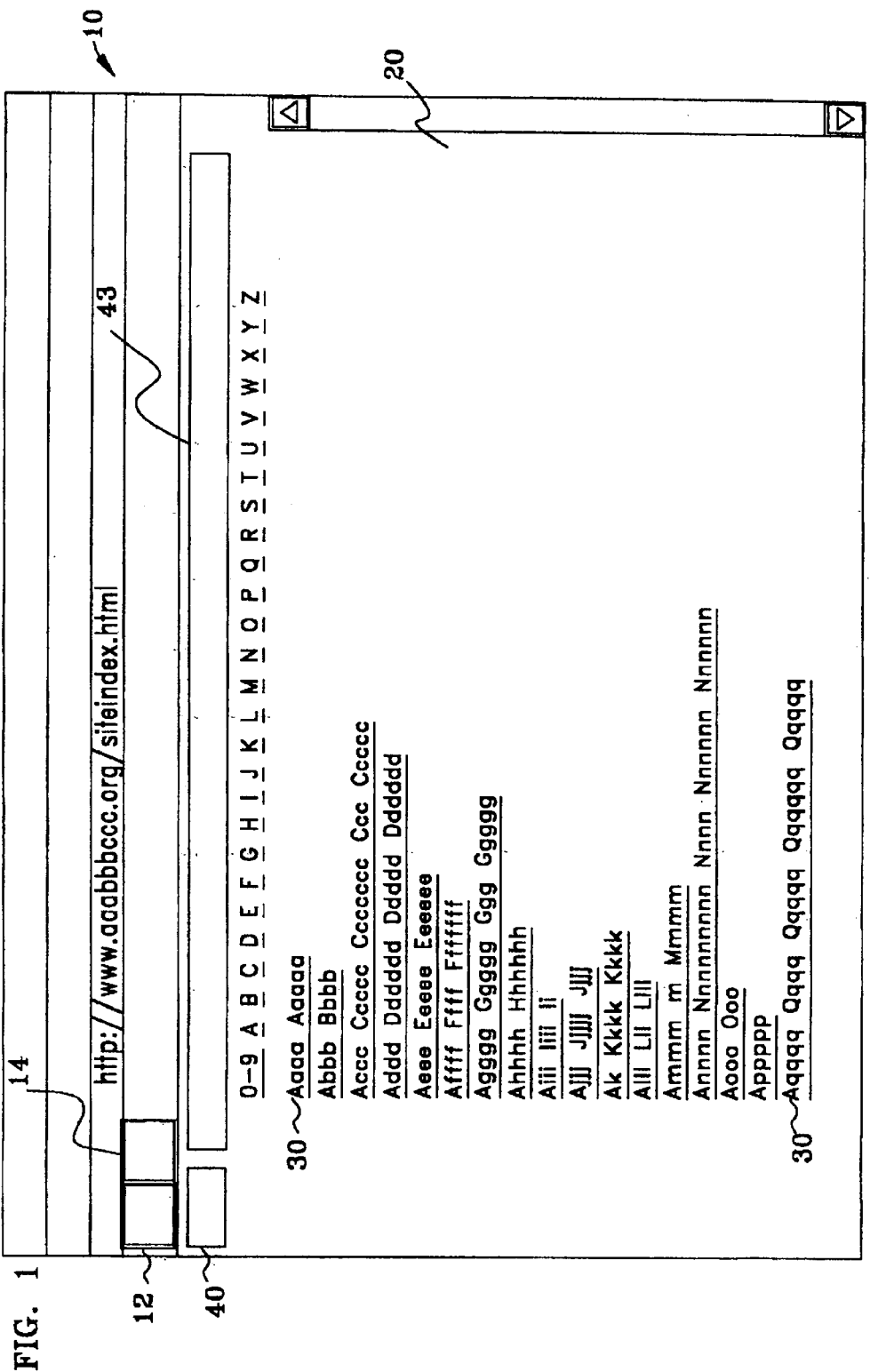
FIG. 1 is a diagram illustrating a Web page containing a plurality of hypertext links and including an icon according to the present invention.
Figure 2:
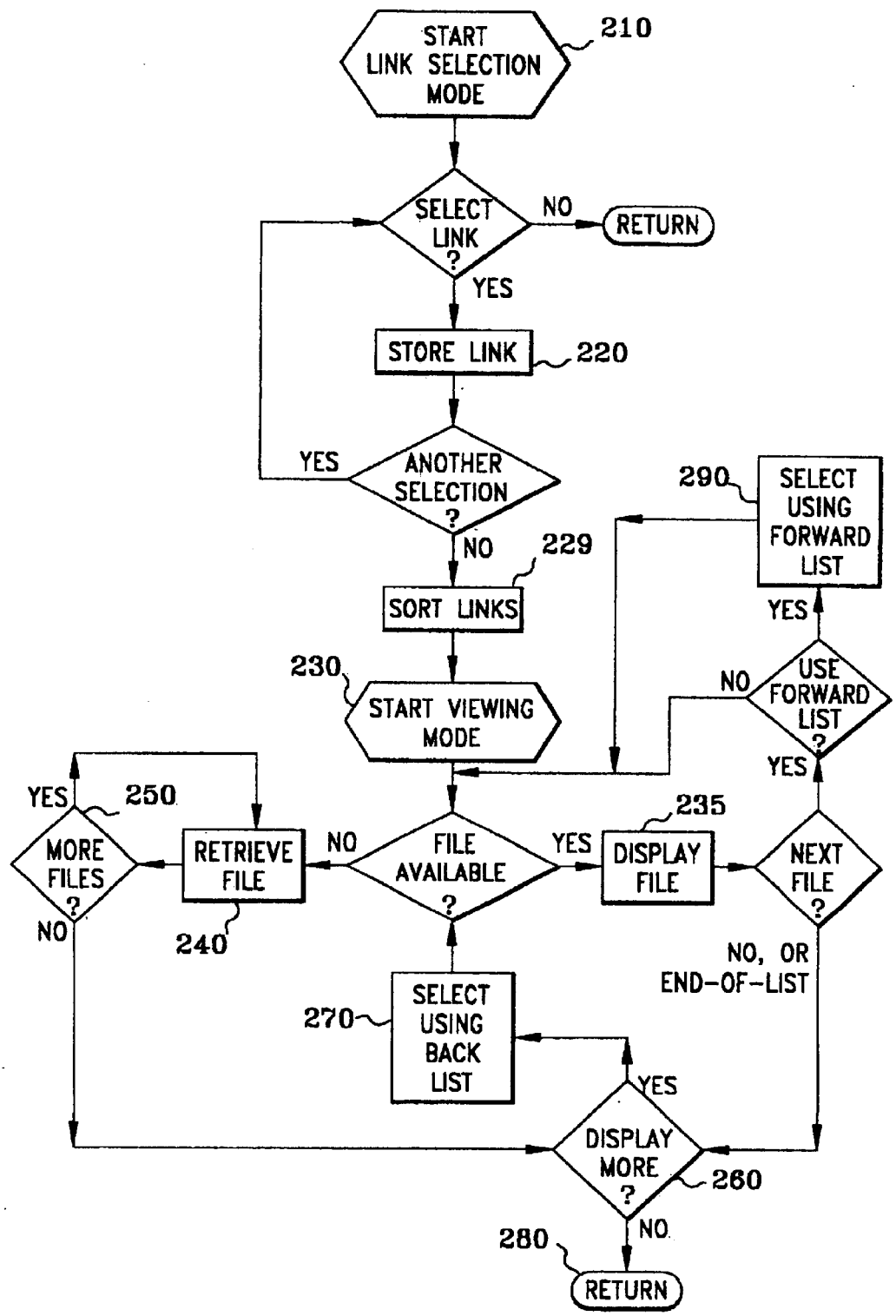
FIG. 2 shows a flow chart of a preferred embodiment of the present invention.

FIG. 1 illustrates a Web browser 10 that has incorporated a plug-in in accordance with the present invention. Displayed within the browser is a Web page 20 for a site that contains many links 30 related to the Web site. A typical example of such a site would be a news publication that contains a list links to articles that are available to be viewed on the site. Often, such a list is provided on a Web page referred to as a site index, as illustrated in FIG. 1. For convenience in this exemplary embodiment, each node associated with a link is referred to as an article, but in the general case, a node could be any accessible file. A typical "Back" button 12 and "Forward" button 14 are illustrated. In this embodiment, the icon 40 represents a button on the browser that would be clicked using a pointer device to start the utility plug-in according to the present invention. The icon 40 is represented as a toolbar button in this example, but many alternative implementations are possible as one skilled in the art would recognize. A flow chart of the plug-in according to this embodiment is illustrated in FIG. 2. When the icon 40 is clicked, the utility is activated, and an informational message 43 is displayed indicating that the browser is in "Hypertext Link Selection Mode" (Block 210). The user may then click on all the links to articles that the user wishes to read, preferably in the order that they are to be displayed. When the browser is in "Hypertext Link Selection Mode," the Universal Resource Location (URL) of each selected hypertext link will be stacked sequentially by "pushing" the URL character string into a temporary storage area, preferably core memory, for each desired article (Block 220).

After all links are selected, the function icon 40 button is clicked again, which converts the browser from "Hypertext Link Selection Mode" to "Sequential Hypertext Viewing Mode" (Block 230), again displaying an informational message 43. Although the preferred embodiment assumes that the hypertext links are already organized in the sequence that user wishes to view the linked files, an additional option can be provided to sort the list in a different order if desired (Block 229).

Each of the requested hypertext articles are loaded in the order in which the links were selected (Block 240) until the list is exhausted (Block 250) or the user decides to terminate the utility (Block 260). If the article or file referenced by the first hypertext link in the list of selected links is available, the utility according to this embodiment will display the file immediately (Block 235). If an error occurs, such as a file-not-found condition, or if the file cannot be loaded for some reason, for example, due to an unresponsive server, the appropriate message will be stored as an error or null-response page, which will be displayed when that associated link is next in the viewing sequence. If the node associated with the link is not a hypertext file, the appropriate plug-in required to handle the file will be invoked. If the plug-in is not available, an appropriate message will be generated and displayed in place of the file at the appropriate point in the viewing sequence. The retrieval of the other nodes in the list of selected links may continue while the user is viewing the first displayed file (Blocks 240 and 250).

In this embodiment, the "Back" button 12 on the browser remains active. Pressing the "Back" button 12 loads the selected article immediately preceding the current article (Block 270). If the current article is the first one selected, then "Back" displays the page containing the original list of selectable links and exits this utility (not shown). However, the function of the "Forward" button 14 is expanded to include loading any of the subsequent articles yet to be viewed sequentially (Block 290). The utility is terminated by a final click on the function icon 40, which reloads the page containing the original list of selected documents and removes the previous list of selected documents from core memory (Block 280).

The present invention thus provides a savings in time and improved usability for the user because the steps of repeatedly clicking the "Back" button can be eliminated when selecting two or more hypertext articles from a Web site menu. In addition, the present invention improves performance by pre-loading selected hypertext files and significantly cuts down on bandwidth resource requirements and communication time by eliminating the need to repeatedly reload the Web page containing the original list of hyperlinks.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. A method for displaying files associated with multiple hypertext links, the method comprising:

providing a computer system having a display device and a pointing device;

displaying a hypertext document on the display device, the hypertext document having an initial plurality of hypertext links, each of the hypertext links having a file associated therewith;

entering a selection mode wherein a user selects a user-selected plurality of hypertext links from said initial plurality of hypertext links by clicking on, in a user-selected order, at least two of said initial plurality of hypertext links using the pointing device without initiating a download of any of said files associated with said hypertext links;

entering a viewing mode and retrieving the files associated with said user-selected plurality of hypertext links in accordance with said user-selected order; and while in said viewing mode, displaying the files associated with said user-selected plurality of hypertext links in accordance with said user-selected order, wherein said retrieving continues concurrently with said displaying.

2. A computer program product having instructions for causing a computer system having a pointing device to perform the method steps for displaying files associated with multiple hypertext links, said method steps comprising:.

displaying a hypertext document on a display device connected to the computer system, the hypertext document having an initial plurality of hypertext links, each of the hypertext links having a file associated therewith;

entering a selection mode wherein a user selects a user-selected plurality of hypertext links from said plurality of hypertext links by clicking on, in a user-selected order, at least two of said initial plurality of hypertext links using the pointing device without initiating a download of any of said files associated with said hypertext links;

entering a viewing mode and retrieving the files associated with said user-selected plurality of hypertext links in accordance with said user-selected order; and while in said viewing mode, displaying the associated files associated with said user-selected plurality of hypertext links in accordance with said user-selected order, wherein said retrieving continues concurrently with said displaying.

3. The computer program product of claim 2 wherein said instructions further comprise a plug-in for a web browser.

4. A computer readable storage device having instructions for causing a computer system having a pointing device to perform the method steps for displaying files associated with multiple hypertext links, said method steps comprising:

displaying a hypertext document on a display device connected to the computer system, the hypertext document having an initial plurality of hypertext links, each of the hypertext links having a file associated therewith;

entering a selection mode wherein a user selects a user-selected plurality of hypertext links from said plurality of hypertext links by clicking on, in a user-selected order, at least two of said initial plurality of hypertext links using the pointing device without initiating a download of any of said files associated with said hypertext links;

entering a viewing mode and retrieving the files associated with said user-selected plurality of hypertext links in accordance with said user-selected order; and while in said viewing mode, displaying the associated files associated with said user-selected plurality of hypertext links in accordance with said user-selected order, wherein said retrieving continues concurrently with said displaying.

5. The computer readable storage device of claim 4 wherein said instructions further comprise a plug-in for a Web browser.

* * * * *